US010414025B2

(12) United States Patent
Zhu et al.

(10) Patent No.: US 10,414,025 B2
(45) Date of Patent: Sep. 17, 2019

(54) WEATHER-RESISTANT POLISHING PAD

(71) Applicant: HUBEI DINGLONG CHEMICAL CO., LTD., Wuhan (CN)

(72) Inventors: Shunquan Zhu, Wuhan (CN); Lili Mei, Wuhan (CN); Yunfeng Li, Wuhan (CN)

(73) Assignee: HUBEI DINGLONG CO., LTD., Wuhan (CN)

( * ) Notice: Subject to any disclaimer, the term of this patent is extended or adjusted under 35 U.S.C. 154(b) by 230 days.

(21) Appl. No.: 15/233,922

(22) Filed: Aug. 10, 2016

(65) Prior Publication Data
US 2017/0043451 A1 Feb. 16, 2017

(30) Foreign Application Priority Data
Aug. 11, 2015 (CN) .......................... 2015 1 0488969

(51) Int. Cl.
| C09K 3/14 | (2006.01) |
| B24D 18/00 | (2006.01) |
| B24D 13/14 | (2006.01) |
| C08G 18/10 | (2006.01) |
| C08G 18/48 | (2006.01) |
| C08G 18/73 | (2006.01) |
| C08G 18/75 | (2006.01) |
| C08G 18/76 | (2006.01) |
| C08G 18/72 | (2006.01) |
| C08K 5/00 | (2006.01) |
| C08K 3/013 | (2018.01) |
| B24D 3/00 | (2006.01) |
| B24D 11/00 | (2006.01) |

(52) U.S. Cl.
CPC ....... B24D 13/147 (2013.01); B24D 18/0009 (2013.01); C08G 18/10 (2013.01); C08G 18/48 (2013.01); C08G 18/724 (2013.01); C08G 18/73 (2013.01); C08G 18/755 (2013.01); C08G 18/7642 (2013.01); C08G 18/7671 (2013.01); C08K 3/013 (2018.01); C08K 5/0008 (2013.01)

(58) Field of Classification Search
CPC . C09K 3/14; B24D 3/00; B24D 11/00; B24D 18/00
See application file for complete search history.

(56) References Cited

U.S. PATENT DOCUMENTS

| 2009/0075568 | A1* | 3/2009 | Kimura | ................... B24B 37/26 451/59 |
| 2012/0100783 | A1* | 4/2012 | Itoyama | .................. B24B 37/24 451/36 |
| 2016/0375554 | A1* | 12/2016 | Qian | .................. B24D 18/0009 51/298 |

FOREIGN PATENT DOCUMENTS

| CN | 1628138 A | 6/2005 |
| CN | 101180158 B | 5/2010 |
| CN | 101530988 B | 9/2012 |
| CN | 103862365 A | 6/2014 |
| JP | 2008254170 A | 10/2008 |
| KR | 20080002981 A | 1/2008 |
| TW | I222390 B | 10/2004 |

* cited by examiner

Primary Examiner — James E McDonough
(74) Attorney, Agent, or Firm — Pattao, LLC; Junjie Feng

(57) ABSTRACT

A weather-resistant polishing pad, including an upper layer operating for polishing, a buffer layer, and a transparent base. The buffer layer is disposed between the upper layer and the transparent base, and the upper layer, the buffer layer, and the transparent base are bonded via a pressure sensitive adhesive or an adhesive agent. The upper layer includes a weather-resistant polyurethane prepolymer, a curing agent, and a functional filler. The polyurethane prepolymer is a polymerization product of polyol and polyfunctional isocyanate. The polyfunctional isocyanate includes a first isocyanate containing no benzene ring, or the first isocyanate having an isocyanato group and a benzene group, and the isocyanato group and the benzene group are connected indirectly.

17 Claims, No Drawings

WEATHER-RESISTANT POLISHING PAD

CROSS-REFERENCE TO RELATED APPLICATIONS

Pursuant to 35 U.S.C. § 119 and the Paris Convention Treaty, this application claims the foreign priority benefit of Chinese Patent Application No. 201510488969.2 filed Aug. 11, 2015, the contents of which, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The invention relates to a weather-resistant polishing pad.

Description of the Related Art

Each polishing pad includes a layer operating to polish. In general, the layer for polishing tends to discolor after working in the sunlight, and due to exposure to ultraviolet light, the polishing pad ages and breaks down. This adversely affects the working characteristics and appearance of the polishing pad.

SUMMARY OF THE INVENTION

In view of the above-described problems, it is one objective of the invention to provide a weather-resistant polishing pad.

To achieve the above objective, in accordance with one embodiment of the invention, there is provided a weather-resistant polishing pad, comprising an upper layer operating for polishing, a buffer layer, and a transparent base. The buffer layer is disposed between the upper layer and the transparent base, and the upper layer, the buffer layer, and the transparent base are bonded via a pressure sensitive adhesive or an adhesive agent. The upper layer comprises a polyurethane prepolymer, a curing agent, and a functional filler. The polyurethane prepolymer is a polymerization product of polyol and polyfunctional isocyanate. The polyfunctional isocyanate comprises a first isocyanate containing no benzene ring, or the first isocyanate having an isocyanato group and a benzene group, and the isocyanato group and the benzene group are connected indirectly.

In a class of this embodiment, the first isocyanate containing no benzene ring is methylene-bis-4,4'-cyclohexyl isocyanate, cyclohexyl diisocyanate, isophorone diisocyanate, hexamethylene diisocyanate, propilidene-1,2-diisocyanate, tetramethylene-1,4-diisocyanate, 1,6-hexamethylene diisocyanate, dodecane-1,12-diisocyanate, cyclobutane-1,3-diisocyanate, cyclohexane-1,3-diisocyanate, cyclohexane-1,4-diisocyanate, 1-isocyanato-3,3,5-trimethyl-5-isocyanato methylcyclohexane, methyl cyclohexene diisocyanate, triisocyanate of hexamethylene diisocyanate, triisocyanate of 2,4,4-trimethyl-1,6-hexane diisocyanate, hexamethylene diisocyanate, ethylene diisocyanate, 2,2,4-trimethyl hexamethylene diisocyanate, dicyclohexyl methane diisocyanate, a derivative thereof, an oligomer thereof, or a mixture thereof; and the first isocyanate having an isocyanato group and a benzene group which are indirectly connected is benzene dimethylene diisocyanate, benzene diethylene diisocyanate, benzene diisopropylidene diisocyanate, tetramethyl benzene dimethylene diisocyanate, a modified compound thereof, a derivative thereof, an oligomer thereof, or a mixture thereof.

In a class of this embodiment, the polyfunctional isocyanate further comprises a second isocyanate having an isocyanato group and a benzene group, and the isocyanato group and the benzene group are connected directly.

In a class of this embodiment, the second isocyanate having an isocyanato group and a benzene group which are connected directly is diphenyl methane diisocyanate, methyl benzene diisocyanate, polymethylene polyphenyl polyisocyanate, naphthalene-1,5-diisocyanate, 3,3'-dimethyl-4,4'biphenyl diisocyanate, p-phenylene diisocyanate, 3,3'-dimethyl-4,4' diphenyl methane diisocyanate, a modified compound thereof, a derivative thereof, an oligomer thereof, or a mixture thereof.

In a class of this embodiment, a mass ratio of the first isocyanate to the second isocyanate in the polyfunctional isocyanate is 100:0-150.

In a class of this embodiment, a viscosity of the polyurethane prepolymer is between 1000 and 35000 mPa·S.

In a class of this embodiment, a mass ratio of the polyurethane prepolymer to the curing agent to the functional filler is 100:2.5-41:0.15-5.

In a class of this embodiment, a mass ratio of the polyol to the polyfunctional isocyanate is 1.5-4:1.

In view of the problems in the related art, studies show that, conventional layers for polishing have some factors which lead to poor weather resistance of the polishing pad, and the modification of the materials of the layers for polishing can improve the weather resistance of the polishing pad. Further studies show that the reaction of the polyol and the polyfunctional isocyanate produces the polyurethane prepolymer having a viscosity of between 1000 and 35000 mPa·S, and layers for polishing prepared by using the polyurethane prepolymer have better weather resistances than other layers for polishing prepared by using regular prepolymer. The layers for polishing prepared by using the polyurethane prepolymer in the long term have slow rate of aging, stable performance of materials, and no color change.

Typically, the high-intensity polyfunctional isocyanate, which is the polyfunctional isocyanate having an isocyanato group in the molecular structure in direct connection to benzene ring, is employed to prepare the polyurethane prepolymer. The polishing pads change color mainly because the direct radiation of ultraviolet ray causes the carbamate groups in the aromatic prepolymer in connection to benzene ring to decompose, and aniline is produced. The anline is then oxidized to form coloring groups having quinone structures. However, when no benzene ring exists in the molecular structure of the polyfunctional isocyanate, or when the benzene ring is in indirect connection to the isocyanato group in the molecular structure of the polyfunctional isocyanate via a group such as methyl, ethyl, and so on, a resonance phenomenon of the benzene ring and the isocyanato group is effectively avoided, as a result, the polyfunctional isocyanate and the prepolymer prepared using the polyfunctional isocyanate are stable when exposed to the sunlight, do not change color, and feature favorable weather resistance and color stability.

In a class of this embodiment, optionally, the polyfunctional isocyanate comprises only the weather-resistant polyfunctional isocyanate, or, the polyfunctional isocyanate comprises both the weather-resistant polyfunctional isocyanate and the high-intensity polyfunctional isocyanate so as to improve the intensity of the layer for polishing.

In a class of this embodiment, the polyol is polyether polyol, polyester polyol, or a mixture thereof. Preferably, the polyol is the polyether polyol. The polyether polyol is poly(tetramethylene oxide) diol, poly(propylidene oxide)

diol, or a mixture thereof. The polyester polyol is poly (ethylene adipate) diol, poly(butylene adipate) diol, poly (ethylidene propylene adipate) diol, phthalate ester-1,6-hexylene glycol, poly(hexylene adipate) diol, poly(phthalate ester) carbonate, poly(carbonate adipate) diol, polycaprolactone of 1,6-hexylene glycol, polycaprolactone of polytetramethylene glycol which is originated from diethylene glycol, polycaprolactone which is originated from poly (tetramethylene oxide) diol and a mixture thereof, or a mixture thereof.

In a class of this embodiment, the curing agent is 4,4'-diamido-3,3'-diphenylmethylene chloride, 4,4'-methylene-o-chloroaniline, diethyl toluene diamine, polypropylene oxide bis(p-aminobenzoate), 3,5-bismethylthio-2,4-toluene diamine and an isomer thereof, 3,5-diethyl toluene-2,4-diamine and an isomer thereof, 3,5-diethyl toluene-2,6-diamine and an isomer thereof, 4,4'-di-(sec-butyl amino)-diphenyl methane, 4,4'-methylene-di(3-chloro-2,6-diethyl aniline), 1,4'-di-(sec-butyl amino)-benzene, polybutylidene oxide-bis-p-aminobenzoate, N,N'-dialkyl diamino diphenyl methane, m-phenylenediamine, methylene-di-2-chloroaniline, 4,4'-methylene-di-(2-chloroaniline), 4,4'-methylene-di-(2,6-diethyl aniline), 4,4'-methylene-di-(2,3-dichloroaniline), bis-p-aminobenzoate-1,3-propylene glycol ester, 4,4'-diamido-3,3'-diethyl-5,5'-dimethyl diphenyl methane, 2,2', 3,3'-tetrachloro diamino diphenyl methane, bis-p-aminobenzoate-propylene glycol ester, bismethylthio toluene diamine, polybutylene oxide bis(p-aminobenzoate), polypropylene oxide p-aminobenzoate, 1,2-bis(2-amino phenylthio) ethane, 4,4'-methylene-diphenylamine, diethyl toluene diamine, 5-tertiary butyl-2,4-toluene diamine, 3-tertiary butyl-2,6-toluene diamine, 5-tertiary pentyl-2,4-toluene diamine, 3-tertiary pentyl-2,6-toluene diamine, chloro-substituted toluene diamine, or a mixture thereof. Specifically, the curing agent is aromatic diamine, and preferably, the curing agent is 3,3' dichloro-4,4'-diphenyl methane.

In a class of this embodiment, the functional filler has fine particles, and optionally, the functional filler is silicon dioxide, cerium oxide, titanium dioxide, aluminium oxide, iron oxide, zirconium oxide, ceramic, polymer microsphere, or a mixture thereof. Preferably, the functional filler is polymer microsphere.

In a class of this embodiment, the materials and the preparation methods of the buffer layer and the transparent base are the same as those in the prior art and no need to illustrate herein.

Advantages of the weather-resistant polishing pad according to embodiments of the invention are summarized as follows:

1. The polyfunctional isocyanate containing no benzene ring is employed to prepare the polyurethane prepolymer, thereby effectively avoiding a resonance phenomenon of the benzene ring and the isocyanato group; or, the polyfunctional isocyanate having the isocyanato group in the molecular structure in indirect connection to benzene ring is employed to prepare the polyurethane prepolymer, thereby solving the resonance problem and satisfying the intensity requirements of the polishing pad. Optionally, the high-intensity polyfunctional isocyanate is added to the polyurethane prepolymer, thus the layer for polishing features both weather resistance and high intensity. The polyfunctional isocyanate comprising both the polyurethane prepolymer and the high-intensity polyfunctional isocyanate reacts with the polyol to form the polyurethane prepolymer which is employed to prepare the polishing pad; on the one hand, the polishing pad is prevented from color and appearance change because of the radiation of the sunlight (mainly because of the ultraviolet ray) during the service life of the polishing pad; on the other hand, the polishing pad is prevented from aging and breaking down. The intensity is enhanced, the storage period and the service life of the polishing pad is prolonged, and the consecutive production ability and the production efficiency of the polishing pad are improved.

2. The production technique of the polishing pad in the invention is similar to the regular production technique, and no antioxidant, or ultraviolet absorber, etc. is added. By preparing the polyurethane prepolymer using special raw materials, the polishing pad features weather resistance, and thus the weather-resistant polishing pad can be widely used in the market.

DETAILED DESCRIPTION OF THE EMBODIMENTS

For further illustrating the invention, experiments detailing a weather-resistant polishing pad are described below. It should be noted that the following examples are intended to describe and not to limit the invention.

Example 1

At an oil bath temperature of 40° C., 100 g of 1,6-hexamethylene diisocyanate was added to a three-neck flask and stirred at a speed of 300 rpm; then 400 g of polyether polyol was added dropwise into the 1,6-hexamethylene diisocyanate to perform a reaction for 2 h to yield a first reaction mixture. The first reaction mixture was deaerated under vacuum to yield a weather-resistant polyurethane prepolymer A1. The viscosity of the weather-resistant polyurethane prepolymer A1 was 22000 mPa·S.

5 g of functional filler was added to the weather-resistant polyurethane prepolymer A1 and mixed, then 53.4 g of curing agent was also added and mixed at a high speed to form a second reaction mixture. The second reaction mixture was poured into a mold and aged in a 90° C. oven for 16 h to yield a layer for polishing 1 of polyurethane polishing pad.

Example 2

At an oil bath temperature of 40° C., 100 g of isophorone diisocyanate was added to a three-neck flask and stirred at a speed of 300 rpm; then 400 g of polyether polyol was added dropwise into the isophorone diisocyanate to perform a reaction for 2 h to yield a first reaction mixture. The first reaction mixture was deaerated under vacuum to yield a weather-resistant polyurethane prepolymer A2. The viscosity of the weather-resistant polyurethane prepolymer A2 was 35000 mPa·S.

4 g of functional filler was added to the weather-resistant polyurethane prepolymer A2 and mixed, then 13.4 g of curing agent was also added and mixed at a high speed to form a second reaction mixture. The second reaction mixture was poured into a mold and aged in a 90° C. oven for 16 h to yield a layer for polishing 2 of polyurethane polishing pad.

Example 3

At an oil bath temperature of 40° C., 100 g of benzene dimethylene diisocyanate was added to a three-neck flask and stirred at a speed of 300 rpm; then 400 g of polyether polyol was added dropwise into the benzene dimethylene diisocyanate to perform a reaction for 2 h to yield a first reaction mixture. The first reaction mixture was deaerated under vacuum to yield a weather-resistant polyurethane prepolymer A3. The viscosity of the weather-resistant polyurethane prepolymer A3 was 28000 mPa·S.

4.5 g of functional filler was added to the weather-resistant polyurethane prepolymer A3 and mixed, then 35 g of curing agent was also added and mixed at a high speed to form a second reaction mixture. The second reaction mixture was poured into a mold and aged in a 90° C. oven for 16 h to yield a layer for polishing 3 of polyurethane polishing pad.

Example 4

At an oil bath temperature of 60° C., 100 g of 1,6-hexamethylene diisocyanate and 75 g of diphenyl methane diisocyanate were added to a three-neck flask to form a mixed solution and stirred at a speed of 300 rpm; then 500 g of polyether polyol was added dropwise into the mixed solution to perform a reaction for 2 h to yield a first reaction mixture. The first reaction mixture was deaerated under vacuum to yield a weather-resistant polyurethane prepolymer A4. The viscosity of the weather-resistant polyurethane prepolymer A4 was 12000 mPa·S.

1 g of functional filler was added to the weather-resistant polyurethane prepolymer A4 and mixed, then 107 g of curing agent was also added and mixed at a high speed to form a second reaction mixture. The second reaction mixture was poured into a mold and aged in a 90° C. oven for 16 h to yield a layer for polishing 4 of polyurethane polishing pad.

Example 5

At an oil bath temperature of 40° C., 100 g of isophorone diisocyanate and 39 g of methyl benzene diisocyanate were added to a three-neck flask to form a mixed solution and stirred at a speed of 300 rpm; then 500 g of polyether polyol was added dropwise into the mixed solution to perform a reaction for 2 h to yield a first reaction mixture. The first reaction mixture was deaerated under vacuum to yield a weather-resistant polyurethane prepolymer A5. The viscosity of the weather-resistant polyurethane prepolymer A5 was 25000 mPa·S.

3.2 g of functional filler was added to the weather-resistant polyurethane prepolymer A5 and mixed, then 45 g of curing agent was also added and mixed at a high speed to form a second reaction mixture. The second reaction mixture was poured into a mold and aged in a 90° C. oven for 16 h to yield a layer for polishing 5 of polyurethane polishing pad.

Example 6

At an oil bath temperature of 40° C., 100 g of benzene dimethylene diisocyanate and 24 g of methyl benzene diisocyanate were added to a three-neck flask to form a mixed solution and stirred at a speed of 300 rpm; then 300 g of polyether polyol was added dropwise into the mixed solution to perform a reaction for 2 h to yield a first reaction mixture. The first reaction mixture was deaerated under vacuum to yield a weather-resistant polyurethane prepolymer A6. The viscosity of the weather-resistant polyurethane prepolymer A6 was 18000 mPa·S.

21 g of functional filler was added to the weather-resistant polyurethane prepolymer A6 and mixed, then 99 g of curing agent was also added and mixed at a high speed to form a second reaction mixture. The second reaction mixture was poured into a mold and aged in a 90° C. oven for 16 h to yield a layer for polishing 6 of polyurethane polishing pad.

Example 7

At an oil bath temperature of 60° C., 100 g of 1,6-hexamethylene diisocyanate and 150 g of diphenyl methane diisocyanate were added to a three-neck flask to form a mixed solution and stirred at a speed of 300 rpm; then 600 g of polyether polyol was added dropwise into the mixed solution to perform a reaction for 2 h to yield a first reaction mixture. The first reaction mixture was deaerated under vacuum to yield a weather-resistant polyurethane prepolymer A7. The viscosity of the weather-resistant polyurethane prepolymer A7 was 5000 mPa·S.

17 g of functional filler was added to the weather-resistant polyurethane prepolymer A7 and mixed, then 160 g of curing agent was also added and mixed at a high speed to form a second reaction mixture. The second reaction mixture was poured into a mold and aged in a 90° C. oven for 16 h to yield a layer for polishing 7 of polyurethane polishing pad.

Example 8

At an oil bath temperature of 40° C., 100 g of isophorone diisocyanate and 78 g of methyl benzene diisocyanate were added to a three-neck flask to form a mixed solution and stirred at a speed of 300 rpm; then 300 g of polyether polyol was added dropwise into the mixed solution to perform a reaction for 2 h to yield a first reaction mixture. The first reaction mixture was deaerated under vacuum to yield a weather-resistant polyurethane prepolymer A8. The viscosity of the weather-resistant polyurethane prepolymer A8 was 6300 mPa·S.

19 g of functional filler was added to the weather-resistant polyurethane prepolymer A8 and mixed, then 160 g of curing agent was also added and mixed at a high speed to form a second reaction mixture. The second reaction mixture was poured into a mold and aged in a 90° C. oven for 16 h to yield a layer for polishing 8 of polyurethane polishing pad.

Example 9

At an oil bath temperature of 40° C., 100 g of benzene dimethylene diisocyanate and 93 g of methyl benzene diisocyanate were added to a three-neck flask to form a mixed solution and stirred at a speed of 300 rpm; then 300 g of polyether polyol was added dropwise into the mixed solution to perform a reaction for 2 h to yield a first reaction mixture. The first reaction mixture was deaerated under vacuum to yield a weather-resistant polyurethane prepolymer A9. The viscosity of the weather-resistant polyurethane prepolymer A9 was 1000 mPa·S.

14.8 g of functional filler was added to the weather-resistant polyurethane prepolymer A9 and mixed, then 203 g of curing agent was also added and mixed at a high speed to form a second reaction mixture. The second reaction mixture was poured into a mold and aged in a 90° C. oven for 16 h to yield a layer for polishing 9 of polyurethane polishing pad.

Example 10

At an oil bath temperature of 60° C., 100 g of diphenyl methane diisocyanate was added to a three-neck flask and stirred at a speed of 300 rpm; then 200 g of polyether polyol was added dropwise into the diphenyl methane diisocyanate to perform a reaction for 2 h to yield a first reaction mixture. The first reaction mixture was deaerated under vacuum to yield a weather-resistant polyurethane prepolymer B1. The viscosity of the weather-resistant polyurethane prepolymer B1 was 4200 mPa·S.

2.4 g of functional filler was added to the weather-resistant polyurethane prepolymer B1 and mixed, then 53 g of curing agent was also added and mixed at a high speed to form a second reaction mixture. The second reaction mixture was poured into a mold and aged in a 90° C. oven for 16 h to yield a layer for polishing 10 of polyurethane polishing pad.

Example 11

At an oil bath temperature of 40° C., 100 g of methyl benzene diisocyanate was added to a three-neck flask and stirred at a speed of 300 rpm; then 300 g of polyether polyol was added dropwise into the methyl benzene diisocyanate to perform a reaction for 2 h to yield a first reaction mixture. The first reaction mixture was deaerated under vacuum to yield a weather-resistant polyurethane prepolymer B2. The viscosity of the weather-resistant polyurethane prepolymer B2 was 3000 mPa·S.

2 g of functional filler was added to the weather-resistant polyurethane prepolymer B2 and mixed, then 72 g of curing agent was also added and mixed at a high speed to form a second reaction mixture. The second reaction mixture was poured into a mold and aged in a 90° C. oven for 16 h to yield a layer for polishing 11 of polyurethane polishing pad.

Examples 10-11 are conventional methods for preparing the polishing pad.

According to the conventional method, the layers for polishing of Examples 1-11 are bonded with the buffer layer and the transparent base in order via an adhesive agent or a pressure sensitive adhesive to yield polishing pads 1-11.

The weather resistances of the layers for polishing are measured by an ASTM D2244-93 "Standard test method for calculation of color differences from instrumentally measured color coordinates". The layers for polishing are disposed in a QUV weathering tester and are radiated by UVB ultraviolet lights. The color features (L*, a*, and b* parameters) of the layers for polishing are measured every 200 radiation hours by a color guide 45/0 BYK Gardner. The color differences (ΔE) are calculated by the ASTM D2244.

The weather resistances of the layers for polishing 10-11 are compared with the weather resistances of the layers for polishing 1-9, and the comparison result is shown in Table 1.

TABLE 1

Color differences (ΔE) of different layers for polishing

| Sample number | Radiation time (h) | | | | |
| --- | --- | --- | --- | --- | --- |
|  | 200 | 400 | 600 | 800 | 1000 |
| Layer for polishing 1 | 3.6 | 3.7 | 3.8 | 3.9 | 4.1 |
| Layer for polishing 2 | 4 | 4.6 | 4.8 | 5.2 | 5.9 |
| Layer for polishing 3 | 12.9 | 13.8 | 14.6 | 15.8 | 17.1 |
| Layer for polishing 4 | 6.5 | 8.9 | 9.4 | 9.6 | 10.3 |

TABLE 1-continued

Color differences (ΔE) of different layers for polishing

| Sample number | Radiation time (h) | | | | |
| --- | --- | --- | --- | --- | --- |
|  | 200 | 400 | 600 | 800 | 1000 |
| Layer for polishing 5 | 6.8 | 9.2 | 9.8 | 10.5 | 11.4 |
| Layer for polishing 6 | 14.2 | 15 | 15.9 | 16.7 | 17.9 |
| Layer for polishing 7 | 14.8 | 15.8 | 16.7 | 17.8 | 19.5 |
| Layer for polishing 8 | 15.2 | 16 | 17.2 | 18.4 | 20.3 |
| Layer for polishing 9 | 19.5 | 20.6 | 22.4 | 24.1 | 25.9 |
| Layer for polishing 10 | 25.8 | 27.2 | 29.9 | 31.7 | 34.5 |
| Layer for polishing 11 | 26.3 | 27.9 | 30.4 | 32.1 | 35 |

As shown in Table 1, the weather resistances of the layers for polishing (Examples 1-3) prepared by using the weather-resistant polyurethane prepolymer at least double the weather resistances of the layers for polishing (Examples 10-11) prepared by using conventional prepolymer. Even though the layers for polishing (Examples 4-9) are prepared by partly using the weather-resistant materials, the weather resistances thereof are improved by 30%.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A polishing pad, comprising:
   an upper layer operating for polishing;
   a buffer layer; and
   a transparent base;
   wherein
   the buffer layer is disposed between the upper layer and the transparent base, and the upper layer, the buffer layer, and the transparent base are bonded via a pressure sensitive adhesive or an adhesive agent;
   the upper layer comprises a polyurethane prepolymer, a curing agent, and a functional filler, wherein a mass ratio of the polyurethane prepolymer to the curing agent to the functional filler is 100:2.5-41:0.15-5;
   the polyurethane prepolymer is a polymerization product of polyol and polyfunctional isocyanate; and
   the polyfunctional isocyanate comprises a first isocyanate containing no benzene ring, or the first isocyanate having an isocyanato group and a benzene group, and the isocyanato group and the benzene group are connected indirectly.

2. The polishing pad of claim 1, wherein the first isocyanate containing no benzene ring is methylene-bis-4,4'-cyclohexyl isocyanate, cyclohexyl diisocyanate, isophorone diisocyanate, hexamethylene diisocyanate, propilidene-1,2-diisocyanate, tetramethylene-1,4-diisocyanate, 1,6-hexamethylene diisocyanate, dodecane-1,12-diisocyanate, cyclobutane-1,3-diisocyanate, cyclohexane-1,3-diisocyanate, cyclohexane-1,4-diisocyanate, 1-isocyanato-3,3,5-trimethyl-5-isocyanato methylcyclohexane, methyl cyclohexene diisocyanate, triisocyanate of hexamethylene diisocyanate, triisocyanate of 2,4,4-trimethyl-1,6-hexane diisocyanate, hexamethylene diisocyanate, ethylene diisocyanate, 2,2,4-trimethyl hexamethylene diisocyanate, dicyclohexyl methane diisocyanate, a derivative thereof, an oligomer thereof, or a mixture thereof; and the first isocyanate having an isocyanato group and a benzene group which are indirectly connected is benzene dimethylene diisocyanate, benzene diethylene diisocyanate, benzene diisopropylidene diisocyanate, tetramethyl benzene dimethylene diisocyanate, a modified compound thereof, a derivative thereof, an oligomer thereof, or a mixture thereof.

3. The polishing pad of claim 1, wherein the polyfunctional isocyanate further comprises a second isocyanate having an isocyanato group and a benzene group, and the isocyanato group and the benzene group are connected directly.

4. The polishing pad of claim 2, wherein the polyfunctional isocyanate further comprises a second isocyanate having an isocyanato group and a benzene group, and the isocyanato group and the benzene group are connected directly.

5. The polishing pad of claim 3, wherein the second isocyanate having an isocyanato group and a benzene group which are connected directly is diphenyl methane diisocyanate, methyl benzene diisocyanate, polymethylene polyphenyl polyisocyanate, naphthalene-1,5-diisocyanate, 3,3'-dimethyl-4,4'biphenyl diisocyanate, p-phenylene diisocyanate, 3,3'-dimethyl-4,4' diphenyl methane diisocyanate, a modified compound thereof, a derivative thereof, an oligomer thereof, or a mixture thereof.

6. The polishing pad of claim 4, wherein the second isocyanate having an isocyanato group and a benzene group which are connected directly is diphenyl methane diisocyanate, methyl benzene diisocyanate, polymethylene polyphenyl polyisocyanate, naphthalene-1,5-diisocyanate, 3,3'-dimethyl-4,4'biphenyl diisocyanate, p-phenylene diisocyanate, 3,3'-dimethyl-4,4' diphenyl methane diisocyanate, a modified compound thereof, a derivative thereof, an oligomer thereof, or a mixture thereof.

7. The polishing pad of claim 3, wherein a mass ratio of the first isocyanate to the second isocyanate in the polyfunctional isocyanate is 100:0-150.

8. The polishing pad of claim 4, wherein a mass ratio of the first isocyanate to the second isocyanate in the polyfunctional isocyanate is 100:0-150.

9. The polishing pad of claim 5, wherein a mass ratio of the first isocyanate to the second isocyanate in the polyfunctional isocyanate is 100:0-150.

10. The polishing pad of claim 6, wherein a mass ratio of the first isocyanate to the second isocyanate in the polyfunctional isocyanate is 100:0-150.

11. The polishing pad of claim 1, wherein a viscosity of the polyurethane prepolymer is between 1000 and 35000 mPa·S.

12. The polishing pad of claim 2, wherein a viscosity of the polyurethane prepolymer is between 1000 and 35000 mPa·S.

13. The polishing pad of claim 3, wherein a viscosity of the polyurethane prepolymer is between 1000 and 35000 mPa·S.

14. The polishing pad of claim 5, wherein a viscosity of the polyurethane prepolymer is between 1000 and 35000 mPa·S.

15. The polishing pad of claim 7, wherein a viscosity of the polyurethane prepolymer is between 1000 and 35000 mPa·S.

16. The polishing pad of claim 10, wherein a viscosity of the polyurethane prepolymer is between 1000 and 35000 mPa·S.

17. The polishing pad of claim 1, wherein a mass ratio of the polyol to the polyfunctional isocyanate is 1.5-4:1.

* * * * *